United States Patent Office 2,921,809
Patented Jan. 19, 1960

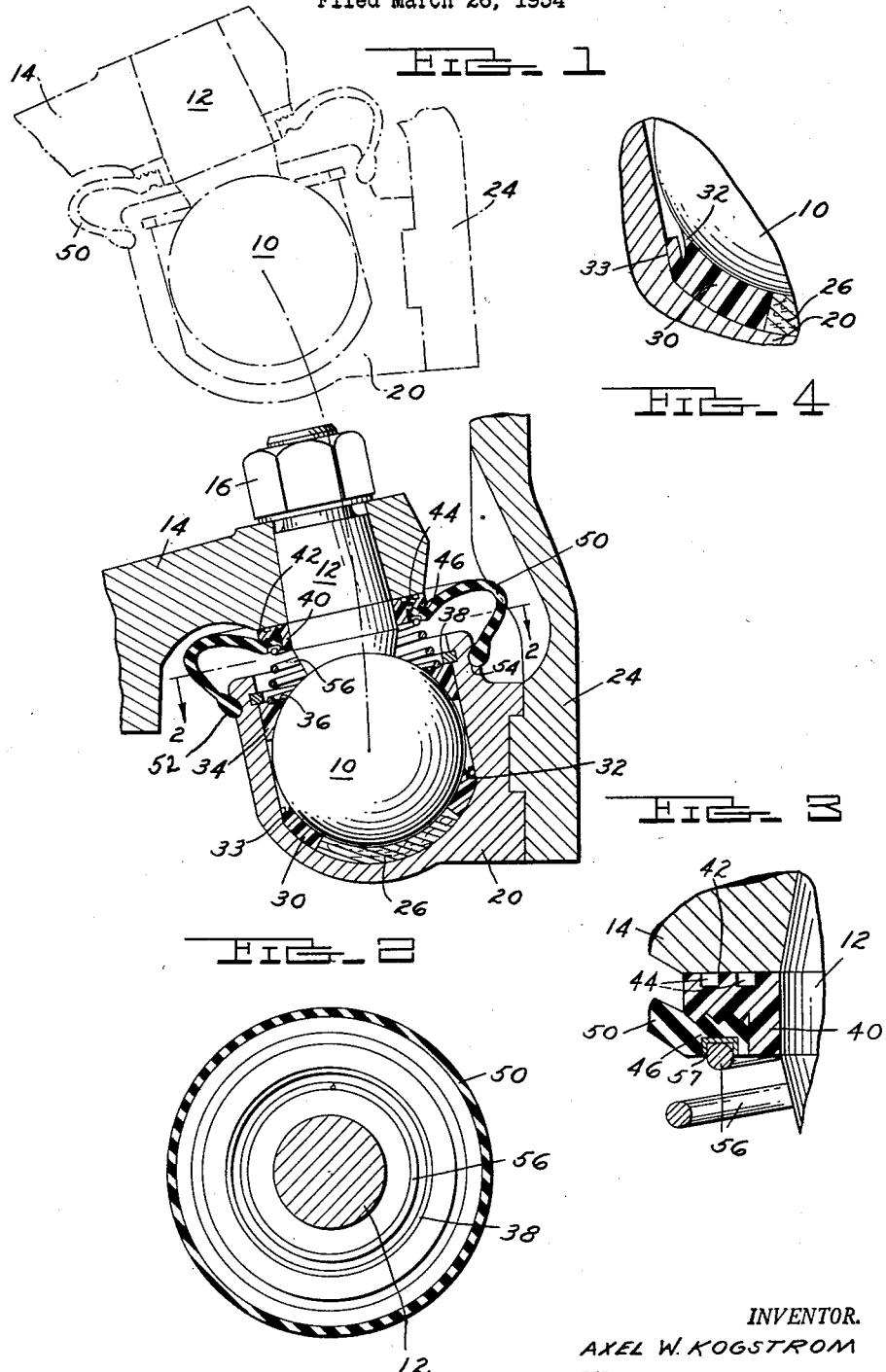

2,921,809

BALL JOINT SEAL

Axel W. Kogstrom, Whitmore Lake, Mich., assignor to O & S Bearing & Mfg. Co., Whitmore Lake, Mich., a corporation of Michigan Application March 26, 1954, Serial No. 418,857

12 Claims. (Cl. 287—90)

This invention relates to a ball joint construction and a sealing protective assembly in combination therewith.

It is an object of the invention to provide a dirt and water seal for a ball joint construction which permits full and unrestricted motion of said ball joint without undue distortion of said sealing parts.

It is a further object to provide a seal which is designed to absorb the motion of the ball joint without destroying the effectiveness of the seal and to provide a sealing arrangement which combines with the joint construction and supplements the wear compensation of the joint parts and the sealing parts.

Briefly, the invention consists of a ball joint having a mounted ball stud and a receiving socket with nylon rings positioned in opposed relation at the stud end of the joint separated by resilient means and surrounded by a protective skirt which moves with the socket member and has a relationship with the stud mount which permits motion without destroying the seal.

Other objects and features of the invention will be apparent in the following description and claims.

Drawings form a part of the disclosure, and the various views thereof may be briefly described as:

Figure 1, a sectional view showing all of the parts in assembled relation with a dotted phantom view showing a second position.

Figure 2, a sectional view on line 2—2 of Figure 1.

Figure 3, an enlarged section showing the relationship of the top annular seal member with the top edge of the skirt and the stud mounting body.

Figure 4, an enlarged portion of Figure 1 showing the details of the parts.

Referring to the drawings, a ball stud member is shown having a ball 10 and a tapered stud 12, the stud being mounted in a portion of a body member 14 and held in place by a nut 16. A socket member 20 suitably mounted on a second body member 24 is provided with a cylindrical opening with a spherical inner end for receiving the ball 10. The ball is socketed against a lubricant-impregnated pad 26 surrounded by a confining ring 30 of nylon or a similar bearing type of material having a lip seal 32 as described fully in Patent No. 2,814,538, issued November 26, 1957. The member 30 has an upper cylindrical portion 33 which stabilizes the ring 30 and the pad 26 in co-operation with the cylindrical walls of socket housing 20 (see Figure 4).

At the open end of the socket is another ring 34 of nylon or a similar material having a lip seal at 36 of the type referred to previously. Ring 34 has a cylindrical outer surface and a spherical inner surface and is retained in contact with ball 10 by a spring 56. A snap ring 38 limits the vertical movement of ring 34 when the load on the bearing is reversed. Surrounding the stud 12 is a ring 40 having a flange 42 provided with a flat upper surface bearing against the mounting body 14. This upper surface has annular grooves 44, Figure 3, between the inner and outer edges and is intended to have a rotating movement with respect to the body 14 and the stud 12. The ring is formed of a hard bearing plastic such as nylon.

The underside of the flange 42 is annularly serrated, and this serrated surface co-operates with a similar surface surrounding the top edge 46 of a skirt 50 formed of rubber, preferably oil resistant, or similar flexible, weather-resistant material having a lower beaded edge 52 anchored in an annular groove 54 surrounding the top of the socket member 20. A coil spring 56 in tapered form bears at one end in an annular groove on the inner edge of the top of the skirt 50 and bears at the other end in an annular groove in the ring 34. This spring serves to hold the skirts, the top edge of the skirt and the ring 40 in place for relative motion with the body 14. The upper annular edge of the skirt 50 is molded around a channel-shaped ring 57 which serves to seat the top end of spring 56 and distribute the pressure radially to seal the parts, insuring a non-moving union between the skirt and the flange 42 of nylon ring 40. The spring also serves to urge the ring 34 into close contact with the ball 10.

It will thus be seen that the ball may have full rotation with respect to the socket without distorting the seal 50; and as shown in the dotted lines of Figure 1, the ball may also have an angular motion in the socket with full compensation of the seal in the skirt 50. Thus, an effective seal is obtained which has a long life and lasting value, the spring 56 serving to maintain it in sealing relation at all times and to compensate for any wear in the moving surfaces.

I claim:

1. In a ball joint construction combining a sealing unit for dirt-free operation which comprises a ball and stud member, a body receiving and securing said stud, a socket member for receiving and securing said ball positioned adjacent but in spaced relation to said body, a further combination of elements which comprises an annular sealing member surrounding said stud and bearing against said body, an annular sealing and bearing member surrounding and in contact with said ball on the stud side thereof, coil spring means interposed between said annular members to urge each of said members toward said ball and said body respectively, and a sealing skirt anchored at one edge in sealing relation to said socket member and having the other edge interposed between said annular stud sealing member and said coil spring to be held in place by said spring, said skirt member being formed of flexible weather-proof material to permit full motion of said ball joint.

2. A device as defined in claim 1 in which the annular sealing members are each formed of a hard wear-resistant material such as nylon, said stud sealing annular member having a rotatable sealing relation with said body.

3. A device as defined in claim 1 in which the annular sealing member surrounding the stud is composed of a plastic material such as nylon and is provided in its outer face with annular grooves to assist in sealing said face against a body when the device is assembled.

4. A device as defined in claim 3 in which the face of said annular sealing member opposite said grooved face is provided with annular serrations co-operating with complemental serrations at the edge of said flexible skirt which is anchored thereto to engage the skirt and the sealing member in sealed fixed relation.

5. A device as defined in claim 4 in which the coil spring urges said annular serrated surfaces together around the circumference thereof.

6. A ball joint assembly construction combining a sealing unit as defined in claim 1 in which the socket member is provided at its closed end bearing against the end of the ball with a lubricant-impregnated pad of material in the form of a segment of sphere, and in which a second annular retaining and sealing ring surrounds said ball and said pad.

7. In a ball joint construction combining a sealing unit for dirt-free operation of the self-lubricating type which includes a ball and stud, a body member receiving and securing said stud, a socket member for receiving and securing said ball positioned adjacent but in spaced relation to said body adapted to have movement relative to said body, a further combination of elements which comprises bearing rings of a relatively hard plastic, such as nylon, surrounding said ball on either side of an equatorial plane normal to the axis of said stud and a third bearing ring surrounding said stud and facing on said body, a coil spring interposed between one of said bearing rings surrounding said ball and said bearing ring surrounding said stud to create bearing pressure, and a sealing skirt anchored at one edge in fixed and sealed relation to said socket member and having the other edge interposed between said spring and said bearing member surrounding said stud, said spring serving to hold said other edge in sealed position relative to said bearing ring.

8. The combination as defined in claim 7 in which the bearing member surrounding the stud is serrated on the body side and one surface of the skirt adjacent the edge is annularly serrated complemental to the bearing member to create a mechanical engagement and sealed union between the said edge of said skirt and said bearing member.

9. The combination as defined in claim 7 in which the bearing rings surrounding the ball each have a cylindrical formation complemental to cylindrical walls of the socket member to stabilize said bearing members within said socket member.

10. The combination as defined in claim 7 in which a lubricant-impregnated fibrous pad is placed in the opening of the bearing ring on the side of the ball opposite the stud to provide lubrication and support for said ball in said socket member.

11. The combination as defined in claim 7 in which an annular seat is provided on the spring side of said skirt edge which bears against said body member, and a ring imbedded in said edge to reinforce the same, said ring having a channel-shaped cross section.

12. In a self-lubricating ball joint construction combining a sealing unit for dirt-free operation and including a ball and stud, a body member receiving and securing said stud, a socket member for receiving and securing said ball positioned adjacent but in spaced relation to said body and adapted to have movement relative to said body, a further combination of elements which comprises a sealing skirt anchored at one edge in fixed and sealed relation to one of said members and having the other edge held in sealed but rotative relation to the other of said members, and means comprising a nylon ring mechanically engaged with the other of said edges and in contact with the other of said members to create a self-lubricating moving sealed bearing surface, said mechanical engagement including an axial interfitting relation, a self-lubricating retaining ring engaging said ball within said skirt, and a common spring means axially engaging said skirt to hold it in mechanical engagement with said nylon ring and engaging said retaining ring to bear against said ball.

References Cited in the file of this patent

UNITED STATES PATENTS

| | | |
|---|---|---|
| 2,083,718 | Kull | June 15, 1937 |
| 2,197,889 | Katcher | Apr. 23, 1940 |
| 2,205,981 | Klages | June 25, 1940 |
| 2,250,348 | Beier | July 22, 1941 |
| 2,288,160 | Flumerfelt | June 30, 1942 |
| 2,397,464 | Booth | Apr. 2, 1946 |
| 2,461,626 | Booth | Feb. 15, 1949 |
| 2,537,629 | Brown | Jan. 9, 1951 |
| 2,591,832 | Kogstrom | Apr. 8, 1952 |
| 2,755,116 | Alldredge | July 17, 1956 |

FOREIGN PATENTS

| | | |
|---|---|---|
| 278,091 | Switzerland | Dec. 17, 1951 |